Aug. 21, 1956   J. R. TIMMONS ET AL   2,759,585
PORTABLE ARTICLE DIVERTER FOR GRAVITY CONVEYORS
Filed Feb. 1, 1952   3 Sheets-Sheet 1
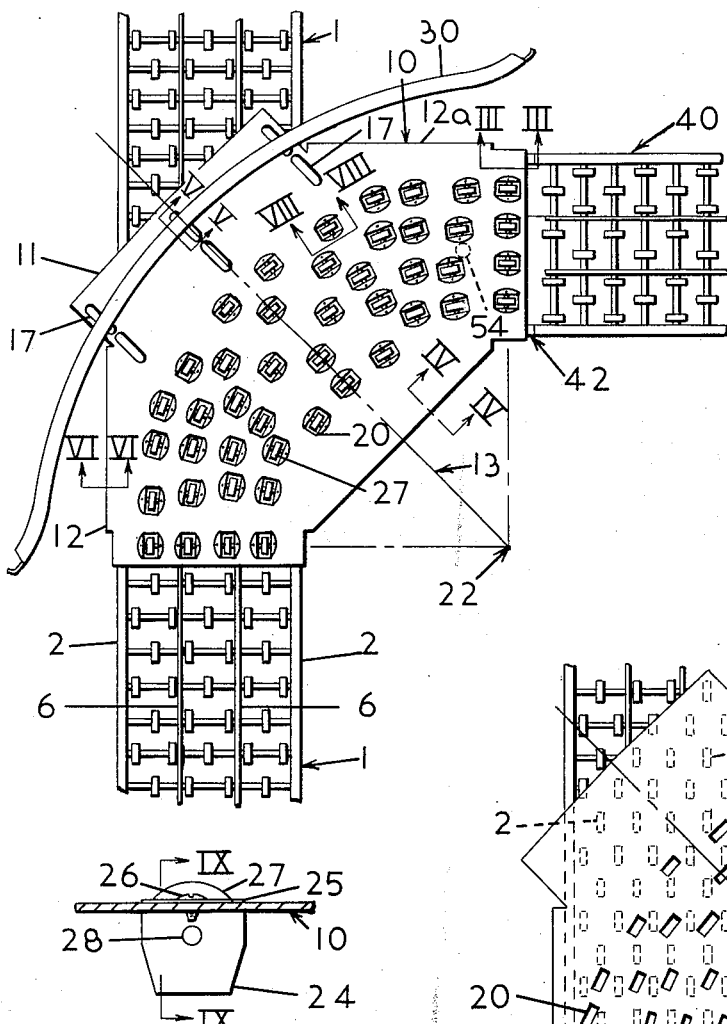
FIG. 1
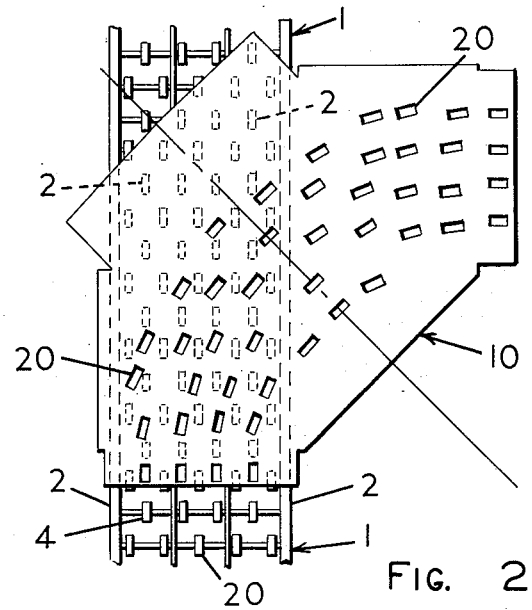
FIG. 2
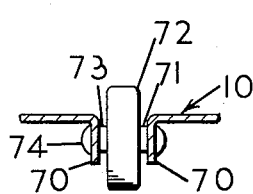
FIG. 8
FIG. 15
INVENTOR
JAMES R. TIMMONS
JAMES R. SEBASTIAN
BY
ATTORNEY Aug. 21, 1956     J. R. TIMMONS ET AL     2,759,585
PORTABLE ARTICLE DIVERTER FOR GRAVITY CONVEYORS
Filed Feb. 1, 1952     3 Sheets-Sheet 2

INVENTOR
JAMES R. TIMMONS
JAMES R. SEBASTIAN
BY
ATTORNEY

Aug. 21, 1956  J. R. TIMMONS ET AL  2,759,585
PORTABLE ARTICLE DIVERTER FOR GRAVITY CONVEYORS

Filed Feb. 1, 1952  3 Sheets-Sheet 3

INVENTOR
JAMES R. TIMMONS
JAMES R. SEBASTIAN
BY
ATTORNEY

United States Patent Office 2,759,585
Patented Aug. 21, 1956

2,759,585

PORTABLE ARTICLE DIVERTER FOR GRAVITY CONVEYORS

James R. Timmons and James R. Sebastian, Grand Rapids, Mich., assignors to The Rapids-Standard Company, Inc., Grand Rapids, Mich., a corporation of Michigan Application February 1, 1952, Serial No. 269,376

11 Claims. (Cl. 193—36)

This invention relates to gravity conveyor equipment and more particularly to a portable device suitable for mounting at substantially any point along a gravity conveyor for diverting articles from a conveyor onto a spur or side track or for directing articles from a spur or side track onto the main track of a conveyor.

The use of gravity conveyor systems for the distribution of articles in warehouses, factories and similar industrial institutions has proved to be an important means of saving substantial time and money. The use of these gravity conveyors, however, has been rendered much less efficient than theoretically possible because of the difficulty of directing the articles on or off the conveyor at their point of storage or to their point of use at any one of numerous stations along the conveyor. Heretofore, it has been necessary to either remove the articles at a point along the conveyor nearest the point of storage or of use and thereafter to transport them the remainder of the distance by hand or truck. If this was to be avoided, it was necessary to provide either a permament or a temporary switch structure in the conveyor for diverting the articles onto a side or spur line leading to the desired terminus for the articles. These spur curves or switches are heavy items not adapted to relocation. Further, their installation in and removal from a conveyor system is a time consuming job. In many cases these switches or curves are designed to be either left or right but are not interchangeable whereby two switches or curves were necessary in order to make it possible for the articles to be directed off either side of the conveyor. In general, this equipment is such that the user must make a choice between the installation of a large number of permanent spur switches or utilizing some type of substitute transportation between the conveyor and the point of final disposition. Neither of these choices was even a reasonably satisfactory answer to the problem.

For these reasons, conveyor systems were rendered static and inflexible to the changing needs of the warehouse or industry involved, thus, eliminating many of the potential savings and advantages which could otherwise be obtained from the use of gravity conveyor equipment.

It is, therefore, a primary object of our invention to provide a light weight, compact and readily portable means for diverting articles from a conveyor to a spur line or for directing articles from a spur line onto a main conveyor track. It is a further object of our invention to provide such a diverter means which may be placed at substantially any point along the conveyor track without the necessity of special anchoring attachments and without modification of the track itself. It is an additional object of our invention to provide such a diverter means which may be used to provide either a right-hand or left-hand curve. It is a still further object of our invention to provide a portable and detachable spur track attachment for a conveyor to be used in cooperation with our portable diverter.

These and other objects and purposes of our invention will be readily seen by those acquainted with the design and use of materials handling equipment upon reading the following specification and the accompanying drawings.

In the drawings:

Figure 1 is a plan view of a fragmentary portion of a main conveyor track and a fragmentary portion of a spur track with our portable article diverter mounted thereon.

Figure 2 is an enlarged, plan view of our portable article diverter mounted on a conveyor section and showing the relationship between the article supporting wheels on the article diverter and the article supporting wheels on the main conveyor track.

Figure 8 is a sectional view taken along the plane VIII—VIII of Figure 1.

Figure 15 is a sectional view taken along the plane XV—XV of Figure 14.

In executing the objects and purposes of our invention, we have provided a plate adapted to seat over and rest upon the conveyor wheels of a gravity conveyor section. Mounted on this plate are a plurality of freely rotatable, article supporting wheels. Each of these wheels projects slightly above the upper surface of the plate. Each of the article supporting wheels is mounted tangent to one of a plurality of concentric circular segments. The pattern of the wheels is symmetrical about the center line of the plate whereby the plate may be seated upon a conveyor to direct the articles either to the right or to the left.

In the following description the terms "upwardly" and "downwardly" are frequently used and are to be taken to mean "upwardly" as toward the top of the article diverter as normally used, that being the face of the article diverter appearing in Figures 1 and 2 and "downwardly" away therefrom. The terms "below" and "above" are to be considered synonymous with "upwardly" and "downwardly" respectively.

The terms "inward" and "outward" are also frequently used and are to be taken to mean "inward" toward the point of origin of the circular segments of the wheel pattern and "outward" away therefrom.

Figure 10:
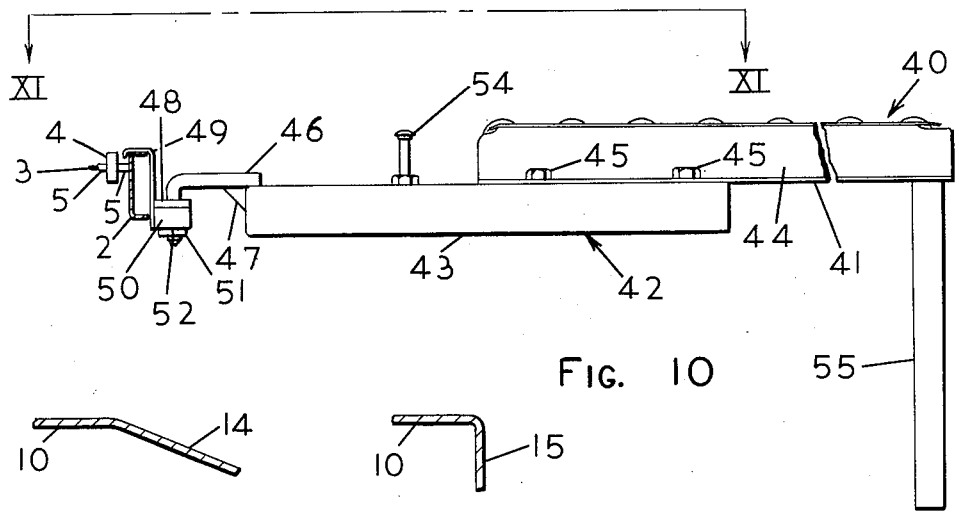
Figure 10 is a side, elevation view of the spur track structure and attachment for my invention.

Referring particularly to the drawings, the numeral 1 indicates a section of conventional gravity conveyor having a pair of supporting side rails 2 between which extend a plurality of axles 3. Each of the axles 3 mounts a plurality of freely rotatable, conveyor wheels 4, held in spaced relationship along the axle by spacer tubes 5 (Figure 10). It will be recognized that the number of conveyor wheels on each axle and the particular pattern of conveyor wheels selected will depend, in part, upon the width of the conveyor, in part upon the type of article to be transported along the conveyor, and in part upon the weight of the articles to be carried by the conveyor. Therefore, the showing of a conveyor wheel pattern including five conveyor wheels on alternate axles and four conveyor wheels on the remaining axles illustrates only one of many possible wheel patterns which could be utilized on a gravity conveyor in connection with our invention. The conveyor wheels 4 are so mounted to the side rails 2 that a small portion of the upper surface of each of the conveyor wheels projects above the side rails, whereby the side rails will not interfere with the movement of oversize articles. The axles 3 are braced by a pair of spaced bars 6 extending longitudinally of the gravity conveyor section 1.

Figure 3:
Figure 3 is a sectional view taken along the plane III—III of Figure 1.
Figure 4:
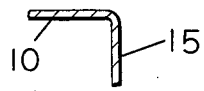
Figure 4 is a sectional view taken along the plane IV—IV of Figure 1.
Figure 5:
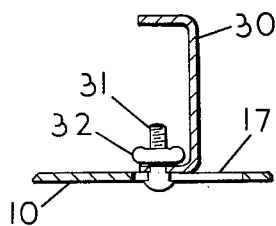
Figure 5 is a sectional view taken along the plane V—V of Figure 1.
Figure 6:
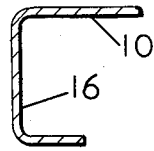
Figure 6 is a sectional view taken along the plane VI—VI of Figure 1.

The frame of the diverter consists primarily of a plate 10 including a flat central portion 11 and a pair of flat wings 12 and 12a, one on each side of the central portion 11, and each inclined in a horizontal plane at 45° to the center portion. The plate 10 has the general shape of a quadrant of a circular plane. Thus, from one edge of the wing 12 to the opposite edge of the wing 12a embraces an arc of 90°. The entire plate 10 is designed to be symmetrical about its center line 13 (Figure 1). The outward edge of each of the wings 12 and 12a includes a flange 14 bent downwardly at a slight angle to provide, among other things, a slight stiffening effect for the plate (Figure 3). The edge of the central portion 11 of the plate extending between the converging ends of the wings is bent downwardly approximately 90° to form a stiffening flange 15 (Figure 4). The outward end of each of the wings 12 and 12a is formed down into an L-shaped reinforcing flange 16 designed to seat against one of the side rails 2 of the gravity conveyor section 1 (Figure 6). The outward end of the central portion 11 of the plate 10 is provided, along each side, with a pair of elongated slots 17 (Figures 1 and 5). The purpose of these slots 17 will be explained more fully hereinafter.

It will be recognized that the shape of our plate 10 as described above, is but a preferred form from the standpoint of weight, compactness and strength. Numerous variations of this shape could be made without departing from the principle of our invention. Some of the modified shapes may even depart, to some extent, from symmetry about their centerlines. We explain this because we do not wish to limit our invention to the particular shape of our plate.

Figure 7:
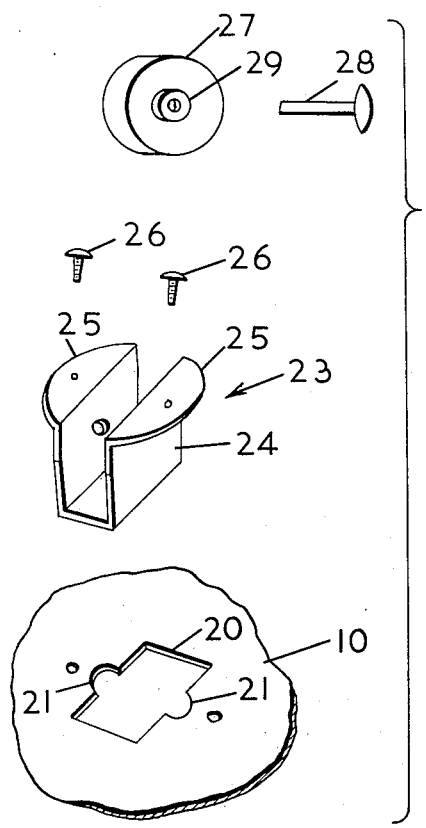
Figure 7 is an exploded view showing a fragment of the plate for our article diverter together with the mounting structure for one of the article supporting wheels.

A plurality of generally rectangular apertures 20 extend through the plate. Each of the apertures 20 has, at its center line, a pair of oppositely disposed notches 21 (Figure 7). The notches are provided to permit the installation of the hereinafter described wheel assemblies. The wheel apertures 20 are arranged in a pattern such that when the plate 10 is placed over the section of gravity conveyor 1, the wheel apertures 20 over the gravity conveyor section 1 are interspersed between the conveyor wheels 4 of the gravity conveyor section (Figure 2). The wheel apertures are arranged in a pattern symmetrical about the center line 13 of the plate. The longitudinal center line of each of the wheel apertures 20 is arranged tangential to a circular segment having as its center or point of origin the point indicated as 22 in Figure 1, this being the point at which the axes of the outer line of wheels 27 in each of the wings 12 and 12a and the center line 13 intersect, when extended. The point 22 also represents the point of origin of the generally arcuate shape of the plate 10 in the particular embodiment of the plate we have chosen to illustrate. By this arrangement, the device is rendered useable on either side of the conveyor merely by rotating the plate in a horizontal plane.

My invention is illustrated with a wheel pattern designed to change the course of an article a full 90°. This angle could as well be 75°, 60°, 45° or some lesser angle. In the case of some of these angles, the plat 10 could more efficiently have the general outline of the segment of a ring, or of a square or rectangle. When some of the shapes are used, the point of origin of the circular segments along which the wheels are arranged need not necessarily have any special relationship to the outline of the plate.

Since various gravity conveyors have different wheel patterns, it is necessary to provide different plates with different aperture arrangements in order to properly intersperse the wheels on the plate between the wheels on the conveyor. All of the wheel patterns used on the plate must, however, be concentric about the midpoint of the circular segments along which the wheels are tangentially arranged.

Figure 9:
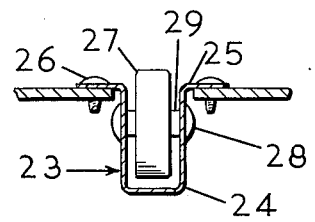
Figure 9 is a sectional view taken along the plane IX—IX of Figure 8.

The wheel assemblies 23 each consist of a yoke 24 having a pair of outwardly directed flanges 25 at its open end (Figures 7, 8 and 9). The yokes 24 are of such size that they may pass through the wheel apertures 20 until the flanges 25 seat against the upper surface of the plate 10. The yokes are anchored to the plate 10 by suitable fastening means such as the self-tapping screws 26. Mounted within each of the yokes 24 is a freely rotatable, conveyor wheel 27 secured to the yoke by a suitable fastening means such as the rivet 28. The yokes 24 are of such size that they protect the wheels 27 against interference at each end of the yoke. The ends of the inner face 29 of the conveyor wheel bearings seat against the inside surfaces of the yoke 24, acting both as spacers and as supports for the yoke. Each conveyor wheel 27 is mounted in its supporting yoke 24 in such a manner that only a small portion of the conveyor wheel projects above the surface of the plate 10.

A guard rail 30 (Figures 1 and 5) of generally U-shaped cross-section is secured to the plate 10 by means of the bolts 31 and wing nuts 32 passing through selected ones of the slots 17 in the central portion 11 of the plate 10. The guard rail 30 is curved to generally conform to the curved pattern of the wheels 27. By means of the slots 17, the guard rail 30 may be moved toward or away from the conveyor wheels 27, depending upon the shape and size of the articles to be passed over the diverter.

Figure 11:
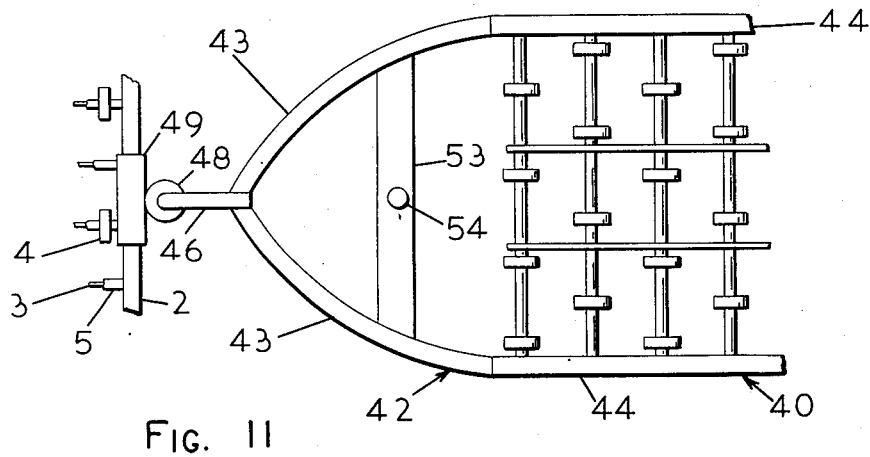
Figure 11 is a plan view of the attachment structure for anchoring the spur track to the main conveyor track and taken along the plane XI—XI of Figure 10.

Because the diverter is particularly designed to be readily portable, it is preferably used in connection with a readily movable spur track 40 (Figures 1, 10 and 11) by which the articles are removed from or supplied to the conveyor with the diverter being used as the transition track between the conveyor and the spur track. The spur track basically consists of a section of conveyor 41 generally similar to the gravity conveyor section 1 and an attachment frame 42. The attachment frame 42 includes a pair of outwardly diverging, curved, side members 43 which, at their outer ends, are separated the same distance as the side rails 44 of the spur conveyor track 41. The side members 43 are anchored to the side rails 44 by any suitable, detachable means such as the bolts 45. The side members 43, away from the spur conveyor track 41, converge substantially to a point where they mount an L-shaped pin 46, the inward leg of which extends downwardly. The pin 46 is braced by the bracket 47. A stop collar 48 is rigidly secured to the pin 46 by any suitable means such as welding.

A supporting bracket 49 having a hook-shaped upper end is adapted to be hung on one of the side rails 2 of the gravity conveyor section 1, by hooking the upper end of the bracket over the side rails. The bracket 49, at its lower end, has a tubular ring 50 through which passes the depending leg of the pin 46. The ring 50 is rigidly secured to the bracket 49 by any suitable means such as welding. Disengagement of the pin 46 from the ring 50 is prevented by the detachable collar 51 secured to the depending leg of the pin 46 by the set screw 52. Intermediate the end of the spur track 40 and the end of the side members 43, a brace 53 extends across the attachment frame 42 between the side members 43. A bolt 54 is mounted through the center of the brace and extends a substantial distance above the top of the brace to provide a support for the plate 10. Normally, the spur track 40 is designed to be a short section of gravity conveyor having conventional means at its outward end whereby it may be attached to additional sections of spur track, as needed.

*Modification*

Figure 12:
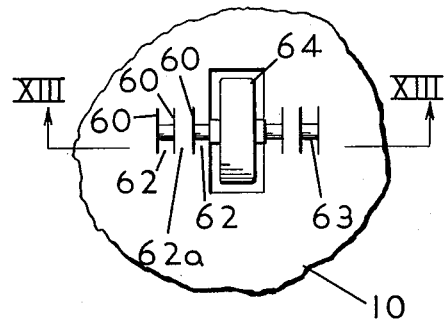
Figure 12 is a fragmentary view of the plate for our article diverter showing a modified mounting structure for the article supporting wheels.
Figure 13:
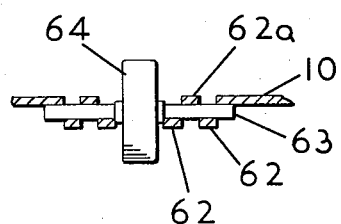
Figure 13 is a sectional view taken along the plane XIII—XIII of Figure 12, but showing only the plate in section.

In the mounting of the conveyor wheels to the plate 10, the yoke 24 may be dispensed with and the plate provided with three parallel slits 60 on each side of the wheel apertures 61 (Figures 12 and 13). Two strips 62, of the three strips formed by the slits 60, may then be depressed or arched downwardly whereby the shaft 63 of the skate wheel 64 may be seated between the two downwardly bowed strips 62 on each side of the skate wheel and the remaining strip 62a and the lower surface of the plate 10. This provides an alternate means by which the conveyor wheels can be mounted to the plate 10.

Figure 14:
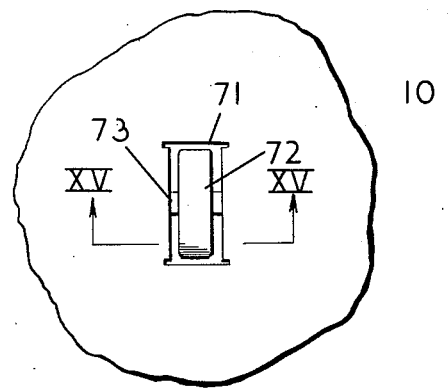
Figure 14 is a fragmentary view of the plate for our article diverter showing a further modified mounting structure for the article supporting wheels.

Another method for mounting the conveyor wheels may be provided by forming an H-shaped cut in the plate and bending a pair of flanges 70 downwardly representing the material that would otherwise be removed to form the wheel apertures 71 (Figures 14 and 15). These flanges 70 extend along the sides of greater dimension of the aperture 71. Each of the conveyor wheels 72 is then mounted between the pair of depending flanges 70 with the ends of the inner face 73 of their bearings held against the flanges by the supporting rivet 74. These represent alternate ways in which the conveyor wheels may be mounted to the plate. When these alternate conveyor wheel mountings are used, it may be necessary to reduce the size of the conveyor wheels in order to prevent them from projecting too far above the upper surface of the plate 10 because of the necessity for mounting the wheels further up than is the case when the yokes 24 are utilized. The conveyor wheels cannot extend too far above the plate 10 or they will interfere with the proper movement of the articles over them.

*Operation*

In preparation to use my portable article diverter at the point along the gravity conveyor line at which it is desired to remove the articles from the conveyor or to feed the articles onto the conveyor, the spur track 40 is mounted to the conveyor track. This is accomplished by hooking the bracket 49 over one of the side rails of the conveyor 2. The bracket will be hung on that side of the conveyor toward which the articles are to be directed or from which they will come. With the bracket 49 in place, the attachment frame 42, together with the section of spur track 40 attached thereto, is put in place by passing the pin 46 downwardly through the ring 50 on the bracket 49. The detachable collar 51 is then brought to bear against the ring 50 and anchored by means of the set screw 52. The other end of the spur track 40 is supported by any suitable leg structure 55.

With the spur track in place, the diverter is then placed on the conveyor in such a manner that the side edge of one of the wings 12 or 12a will be perpendicular to the longitudinal axis of the gravity conveyor section 1 and the edge of the other wing will be parallel to it and perpendicular to the longitudinal axis of the spur track 40. In this position, the center line 13 of the plate 10 will bisect the angle defined between the spur track 40 and the gravity conveyor section 1. Since the wheel pattern of the plate 10 is symmetrical about this center line, it is immaterial whether the spur track extends from the right or the left-hand side of the gravity conveyor section 1 and it is immaterial whether the articles are to approach from or travel away along the gravity conveyor section 1 to the left or to the right of the spur track. The plate 10 is so designed that it may be lifted from the gravity conveyor section 1, rotated through a complete circle in a horizontal plane and will seat upon the gravity conveyor section after each 90° of rotation. When the diverter is in place, the guard rail 30 will act as a guide on the outside of the curve through which the articles will pass. The guard rail 30 prevents the articles from accidentally failing to make the curve established by the pattern of wheels in the plate 10. The guard rail is only necessary when the articles are very large or they are moving at an excessive rate of speed as they approach the diverter, or under pressure from a following line of articles.

When it is desired to relocate the spur track, it is only necessary to lift the plate 10 from the conveyor, relocate the spur track at its new location and again place the diverter in operating position between the two tracks. Thus, a number of stations along the conveyor may be served in sequence using only a single diverter and a single spur track with a minimum of time loss and a minimum investment in equipment. The downwardly inclined flanges 14 and 14a on the wings 12 and 12a respectively, with the conveyor wheels 27 mounted therein, serve as ramps to ease the articles on and off the diverter. Thus, an excessive amount of the momentum of the articles will not be lost in transiting the diverter due to climbing upon the conveyor wheels of the diverter as the articles enter the diverter unit. To this end it is also important that the plate 10, together with its conveyor wheels 27 have a low silhouette, that is, extend a minimum distance above the top of the conveyor wheels 4.

Since gravity conveyor utilizing conveyor wheels normally employs a wheel pattern repeated only on alternate axles, our diverter plate will, on such conveyors, be adapted to seat only at spacings along the conveyor representing the distance between alternate axles. This normally will not seat over a joint between sections of conveyor since it is customary at these joints to vary the wheel pattern on each side thereof to accommodate the couplers for the sections.

The diverter is held in place, preferably, by the engagement between the yokes 24 of the conveyor wheels 27 and the axles 3 for the conveyor wheels 4. This arrangement provides a large number of points of contact between the diverter and the gravity conveyor section 1 whereby the diverter plate will be held from shifting. Although a slight shift of the diverter plate may occur when it is first used, the force of the articles entering the diverter plate will move the plate in the direction of movement of the articles a very slight distance until a firm engagement is made between the yokes 24 and the axles 3. Thereafter the diverter plate will remain in position. The weight of the diverter plate and of the articles passing over it is carried by the conveyor wheels 4. Since the diverter plate overlays a large number of these conveyor wheels, an excessive load will not be imposed on any one conveyor wheel. It will be recognized that it is possible to design the diverter so that suitable legs are provided beneath the plate 10 to cause the weight of the plate to bear directly upon the side rails 2 of the gravity conveyor section 1 rather than on the conveyor wheels 4. It is also possible to provide a means to clamp the diverter to the gravity conveyor section 1. These, however, are additions to our invention and refinements which are normally unnecessary to the satisfactory functioning of our invention.

Various modifications of our invention may be made without departing from the principle thereof. Each of these modifications is to be considered as included in the hereinafter appended claims unless the language of these claims expressly provided otherwise.

I claim:
1. In a portable article diverter for a gravity conveyor having a plurality of fixedly spaced conveyor wheels having the top surfaces thereof arranged in a first plane, the combination comprising: a plate adapted to rest upon said conveyor wheels; said plate covering said conveyor wheels; said plate having a plurality of conveyor wheels mounted thereon; the axes of said conveyor wheels on said plate being below said plate, the tops of said conveyor wheels projecting slightly above the upper surface of said plate; said conveyor wheels on said plate being arranged in a pattern of concentric circular segments; said conveyor wheels on said plate being adapted to seat between the conveyor wheels of said gravity conveyor with the top surfaces thereof arranged in a second plane vertically spaced above said first plane; the pattern of said conveyor wheels on said plate being symmetrical about a line extending radially from the point of origin of said pattern of said conveyor wheels and midway between the ends of said circular segments, whereby said plate may be rotated about said midway line and seated on said gravity conveyor at each 90° of rotation.

2. In a portable article diverter for a gravity conveyor having a plurality of fixedly spaced conveyor wheels having the top surfaces thereof arranged in a first plane, the combination comprising: a plate adapted to rest upon said conveyor; said plate covering said conveyor wheels; said plate having a plurality of conveyor wheels mounted thereon with the top segment of said conveyor wheels projecting slightly above the upper surface of said plate; said conveyor wheels on said plate being arranged in a pattern of concentric circular segments; said conveyor wheels on said plate being adapted to seat between the conveyor wheels of said gravity conveyor with the top surfaces thereof arranged in a second plane vertically spaced above said first plane; the pattern of said conveyor wheels on said plate being symmetrical about a line midway between the ends of said circular segments, whereby said plate may be rotated about said midway line and seated on said gravity conveyor at each 90° of rotation.

3. In a portable article diverter adapted to be seated on a section of gravity conveyor having a pair of side rails mounting a plurality of fixedly spaced article supporting rotatable wheels therebetween having the top surfaces thereof arranged in a first plane, the combination comprising: a plate having substantially the shape of a quadrant of a circular plane and adapted to rest upon said conveyor; said plate covering said article supporting wheels; said plate tracing an arc of approximately 90° and being symmetrical about its centerline; a plurality of freely rotatable wheels mounted on said plate each of said wheels arranged tangentially to one of a plurality of concentric circles having the same point of origin as the arc traced by said plate; said wheels arranged in a pattern symmetrical about the centerline of said plate with the top surfaces thereof arranged in a second plane vertically spaced above said first plane; the axes of said wheels being below said plate whereby only a small segment of each of said wheels projects above said plate.

4. In a portable article diverter adapted to be seated on a section of gravity conveyor having a pair of side rails mounting a plurality of fixedly spaced article supporting rotatable wheels therebetween having the top surfaces thereof arranged in a first plane, the combination comprising: a plate adapted to rest upon and overlie said conveyor; said plate being symmetrical about its centerline; a plurality of freely rotatable wheels mounted on said plate, said wheels arranged in a pattern of concentric circular segments; said wheels arranged in a pattern; said wheels when said plate rests upon said conveyor having the top surfaces thereof arranged in a second plane vertically spaced above said first plane.

5. In a portable article diverter for a gravity conveyor having a plurality of fixedly spaced article supporting wheels having the top surfaces thereof arranged in a first plane, the combination comprising: a plate adapted to rest upon and cover said conveyor wheels; a plurality of apertures through said plate, said apertures being arranged in a pattern of concentric circular segments; said apertures being arranged in a pattern symmetrical about the midpoint of said circular segments; a stationary generally U-shaped cradle mounted in each of said apertures; each of said cradles having a pair of outwardly extending flanges; said flanges being seated upon the upper surface of said plate; a freely rotatable wheel mounted in each of said cradles, each of said wheels having its axis below said plate whereby only a small segment of each of said wheels projects above said plate; said wheels when said plate rests upon said conveyor having the top surfaces thereof arranged in the second plane vertically spaced above said first plane.

6. In a portable article diverter adapted to be seated on a section of gravity conveyor having a fixed pair of rails, a plurality of axles mounted to and extending between said rails, said axles being spaced longitudinally of said rails, freely rotatable wheels mounted on each of said axles, said wheels being spaced along said axles and having the top surfaces thereof arranged in a first plane, said article diverter in combination comprising: a plate adapted to rest upon and overlay said conveyor with approximately one-half of said plate overlaying said conveyor; said plate being adapted to cover those of said wheels in the portion of said conveyor overlaid by said plate; said plate being symmetrical about its centerline; a plurality of freely rotatable wheels mounted on said plate, said wheels arranged in a pattern of concentric circular segments, said circular segments extending equal distances each side of the centerline of said plate; said wheels on said half of said plate overlaying said conveyor being interspersed between the wheels on said axles of said conveyor and having the top surfaces thereof arranged in a second plane vertically spaced above said first plane, the pattern of said wheels being symmetrical about the centerline of said plate, whereby said plate may be rotated about its center and seat upon said conveyor after each 90° of rotation.

7. A portable article diverter for a gravity conveyor having a plurality of fixedly spaced conveyor wheels having the top surfaces thereof arranged in a first plane, said diverter comprising: a plate adapted to rest upon and cover said conveyor wheels; said plate having a plurality of conveyor wheels mounted thereon; the axes of said conveyor wheels on said plate being below said plate, the tops of said conveyor wheels projecting slightly above the upper surface of said plate; said conveyor wheels on said plate being arranged in a pattern of concentric circular segments; said conveyor wheels on said plate being adapted to seat between the conveyor wheels of said gravity conveyor with the top surfaces thereof arranged in a second plane vertically spaced above said first plane; the pattern of said conveyor wheels on said plate being symmetrical about a line extending radially from the point of origin of said pattern of said conveyor wheels and midway between the ends of said circular segments, whereby said plate may be rotated about said midway line and seated on said gravity conveyor at selected points of rotation.

8. In a portable article diverter for a gravity conveyor, said conveyor having a plurality of fixedly spaced wheels having the top surfaces thereof arranged in a first plane, the combination comprising: a frame independent of said conveyor having a plurality of wheels mounted therein; said frame adapted to rest upon said conveyor with said wheels nested between the said wheels of said conveyor with the top surfaces thereof arranged in a second plane vertically spaced above said first plane; said wheels on said frame being arranged in a pattern, said pattern at one end being aligned with the wheels of said conveyor and at the other end extending laterally away from said conveyor.

9. In a portable article diverter for a gravity conveyor, said conveyor having a plurality of fixedly spaced wheels having the top surfaces thereof arranged in a first plane, the combination comprising: a flat frame independent of said conveyor having a plurality of freely rotatable article supporting members mounted therein; said frame adapted to rest upon said conveyor with said article supporting members nested between the said wheels of said conveyor with the top surfaces thereof arranged in a second plane vertically spaced above said first plane; said article supporting members being arranged in an arcuate pattern, said pattern at one end being aligned with the wheels of said conveyor.

10. In a gravity conveying system having a main track with a first set of fixedly spaced rotatable wheels having the top surfaces thereof arranged in a first plane for conveying articles on said main track; a spur track having a second set of a plurality of spaced wheels adapted to convey articles on said spur track; said first set of wheels being laterally separated from said second set; the improvement of a portable article diverter for diverting and conveying said articles from said main track to said spur track said diverter comprising: a plate having a plurality of conveyor wheels mounted thereon; said plate adapted to rest upon said main track and said spur track so that the top surfaces of said wheels on said plate are arranged in a second plane vertically spaced above said first plane; the tops of said conveyor wheels projecting slightly above the upper surface of said plate; each of said conveyor wheels on said plate being arranged in a pattern of concentric circular segments; said conveyor wheels on said plate being adapted to seat between said conveyor wheels of said first set of wheels; the pattern of said conveyor wheels on said plate being symmetrical about a line extending radially from the point of origin of said pattern of said conveyor wheels and midway between the ends of said circular segments, whereby said plate is adapted to bridge the gap between said sets of wheels regardless of whether said spur track extends to the right or to the left of said main track.

11. In a gravity conveying system having a main track with a first set of fixedly spaced rotatable wheels having the top surfaces thereof arranged in a first plane for conveying articles on said main track; a spur track having a second set of a plurality of spaced wheels adapted to convey articles on said spur track; said first set of wheels being laterally separated from said second set; the improvement of a portable article diverter for diverting and conveying said articles from said main track to said spur track said diverter comprising: a frame independent of said main and spur tracks and having a plurality of wheels mounted therein; said frame adapted to rest upon said main and spur tracks with said wheels nested between the wheels of said first set and the top surfaces thereof arranged in a plane spaced vertically from said first plane; said wheels on said frame being arranged in a pattern, said pattern at one end being aligned with the wheels of said first set and at the other end being aligned with the wheels of said second set.

References Cited in the file of this patent
UNITED STATES PATENTS

| | | |
|---|---|---|
| 232,120 | Fisher | Sept. 14, 1880 |
| 549,839 | Aiken | Nov. 12, 1895 |
| 2,457,408 | Sebastian | Dec. 28, 1948 |
| 2,634,843 | Timmons | Apr. 14, 1953 |